US010148673B1

(12) United States Patent
Duchin et al.

(10) Patent No.: US 10,148,673 B1
(45) Date of Patent: Dec. 4, 2018

(54) AUTOMATIC SELECTION OF MALICIOUS ACTIVITY DETECTION RULES USING CROWD-SOURCING TECHNIQUES

(71) Applicant: EMC Corporation, Hopkinton, MA (US)

(72) Inventors: Zohar Duchin, Herzliya (IL); Alon Kaufman, Herut (IL); Oleg Freylafert, Hod Hasharon (IL); Lior Asher, Tel Aviv (IL); Alex Zaslavsky, Peteh Tiqwa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 329 days.

(21) Appl. No.: 14/870,218

(22) Filed: Sep. 30, 2015

(51) Int. Cl.
*H04L 29/06* (2006.01)

(52) U.S. Cl.
CPC ...... *H04L 63/1416* (2013.01); *H04L 63/1441* (2013.01)

(58) Field of Classification Search
CPC ................ H04L 63/1416; H04L 63/1441
See application file for complete search history.

(56) References Cited

U.S. PATENT DOCUMENTS

| 7,134,141 | B2 | 11/2006 | Crosbie et al. |
| 7,522,531 | B2 | 4/2009 | Joiner et al. |
| 7,664,963 | B2 | 2/2010 | Kohler, Jr. et al. |
| 7,685,271 | B1 * | 3/2010 | Schneider ............... H04L 43/50 709/204 |
| 7,818,797 | B1 | 10/2010 | Fan et al. |
| 7,930,747 | B2 * | 4/2011 | Durie .................... G06F 21/577 709/223 |
| 8,074,277 | B2 | 12/2011 | Freund |
| 8,225,398 | B2 * | 7/2012 | Durie .................... G06F 21/55 700/14 |
| 8,230,507 | B1 | 7/2012 | Njemanze et al. |

(Continued)

OTHER PUBLICATIONS

Jia et al "Performance Evaluation of a Collaborative Intrusion Detection System," IEEE, 2009, pp. 409-413.*

(Continued)

*Primary Examiner* — Luu T Pham
*Assistant Examiner* — James J Wilcox
(74) *Attorney, Agent, or Firm* — BainwoodHuang

(57) ABSTRACT

Techniques of operating intrusion detection systems provide a recommendation of an intrusion detection rule to an administrator of an intrusion detection system based on the experience of another administrator that has used the rule in another intrusion detection system. For example, suppose that electronic circuitry receives a numerical rating from a first intrusion detection system that indicates whether an intrusion detection rule was effective in identifying malicious activity when used in the first intrusion detection system. Based on the received rating and attributes of the first intrusion detection system, the electronic circuitry generates a predicted numerical rating that indicates whether the intrusion detection rule is likely to be effective in identifying malicious communications when used in a second intrusion detection system. If the predicted numerical rating is sufficiently high, then the electronic circuitry transmits a message to the second intrusion detection system recommending the intrusion detection rule for use in the second intrusion detection system.

15 Claims, 4 Drawing Sheets

(56) References Cited

U.S. PATENT DOCUMENTS

| | | | |
|---|---|---|---|
| 9,043,894 B1* | 5/2015 | Dennison | G06F 21/552 726/11 |
| 9,171,155 B2* | 10/2015 | Romanenko | G06F 21/56 |
| 9,438,614 B2* | 9/2016 | Herz | G06Q 20/201 |
| 9,621,589 B2* | 4/2017 | Durie | H04L 63/1408 |
| 9,690,937 B1* | 6/2017 | Duchin | G06F 21/562 |
| 9,904,579 B2* | 2/2018 | Shear | G06F 9/50 |
| 9,961,096 B1* | 5/2018 | Pierce | H04L 63/1425 |
| 2005/0076245 A1* | 4/2005 | Graham | G06F 21/552 726/4 |
| 2007/0156696 A1* | 7/2007 | Lim | G06F 21/6218 |
| 2008/0059474 A1* | 3/2008 | Lim | G06F 17/3089 |
| 2011/0208629 A1* | 8/2011 | Benefield | G06Q 40/02 705/35 |
| 2011/0252479 A1* | 10/2011 | Beresnevichiene | H04L 63/1433 726/25 |
| 2012/0137367 A1* | 5/2012 | Dupont | G06F 21/00 726/25 |
| 2012/0174227 A1* | 7/2012 | Mashevsky | G06F 21/562 726/24 |
| 2014/0143825 A1* | 5/2014 | Behrendt | G06F 21/552 726/1 |
| 2014/0196144 A1* | 7/2014 | Trost | H04L 63/1408 726/22 |
| 2015/0200962 A1* | 7/2015 | Xu | G06F 21/562 726/23 |
| 2015/0207813 A1* | 7/2015 | Reybok | H04L 63/145 726/22 |
| 2015/0319185 A1* | 11/2015 | Kirti | H04L 63/1416 726/23 |
| 2015/0381637 A1* | 12/2015 | Raff | H04L 63/0218 726/23 |
| 2016/0080420 A1* | 3/2016 | Ray | H04L 63/20 726/1 |
| 2016/0099963 A1* | 4/2016 | Mahaffey | H04L 63/1433 726/25 |
| 2016/0173509 A1* | 6/2016 | Ray | H04L 63/1425 726/23 |
| 2016/0350531 A1* | 12/2016 | Harris | H04L 63/1416 |
| 2017/0093910 A1* | 3/2017 | Gukal | H04L 63/1416 |
| 2017/0357814 A1* | 12/2017 | Mahaffey | H04L 63/1433 |
| 2018/0004948 A1* | 1/2018 | Martin | H04L 63/1425 |
| 2018/0219888 A1* | 8/2018 | Apostolopoulos | H04L 63/1425 |

OTHER PUBLICATIONS

Stakhanova et al "Managing Intrusion Detection Rule Sets," Eurosec '10, Paris, France, IEEE 2010, pp. 29-35.*

* cited by examiner

Rating Entries
146

| System ID | Rule ID | Rating |
|---|---|---|
| 00000 | 01010101 | 4.2 |
| 00000 | 45789910 | 1.3 |
| ... | ... | |
| 00001 | 837684389 | 3.5 |
| ... | ... | |
| 00002 | 834989832 | 2.9 |
| ... | ... | |
| 00003 | 000234721 | 4.8 |
| ... | ... | |
| 00051 | 01010101 | 0.2 |
| ... | ... | ... |

# AUTOMATIC SELECTION OF MALICIOUS ACTIVITY DETECTION RULES USING CROWD-SOURCING TECHNIQUES

BACKGROUND

An intrusion detection system monitors a computerized environment for indicators of malicious activities and takes a specified action in response to detecting such an indicator. In one example, an intrusion detection system monitors a computer system for the presence of malware (e.g., viruses and malicious code) and blocks such malware upon detection. In another example, an intrusion detection system monitors network communications for cyberattacks and other malicious transmissions and issues an alert upon detection.

In a conventional approach to operating an intrusion detection system, a skilled administrator defines the actions to be taken by the intrusion detection system in response to indicators of malicious activities. The administrator typically bases such definitions on sources of intelligence such as reports of emerging threats. In choosing the sources of intelligence and defining the actions to be taken, the administrator applies considerable experience and knowledge so that the intrusion detection system may keep up with emerging threats.

SUMMARY

Unfortunately, there are deficiencies in the above-described conventional approach in which a skilled administrator relies on past experience and knowledge to operate an intrusion detection system. For example, this conventional approach is too reliant on the past experience and knowledge of the administrator in defining the actions that an intrusion detection system takes in response to indicators of malicious activities. Such an overreliance on the experience and knowledge of an administrator may result in vulnerabilities when another, less experienced administrator operates the intrusion detection system.

Further, the conventional approach relies on the administrator to manually research and interpret the sources of intelligence to define the actions that an intrusion detection system takes in response to indicators of malicious activities. However, it is burdensome for such an administrator to continuously maintain up-to-date threat awareness and to quickly adapt the intrusion detection system in response to emerging threats. Further, the actions defined by the administrator through interpretations of the sources of intelligence are not personalized to the administrator's intrusion detection system. Hence, many such actions are frequently false alerts.

In contrast to the conventional approach to operating an intrusion detection system that is burdensome and dependent on the skill level of an administrator, improved techniques provide a recommendation of an intrusion detection rule to an administrator of an intrusion detection system based on the experience of another administrator that has used the rule in another intrusion detection system. For example, electronic circuitry receives a numerical rating from a first intrusion detection system that indicates whether an intrusion detection rule was effective in identifying malicious activity when used in the first intrusion detection system. Based on the received rating and attributes of the first intrusion detection system, the electronic circuitry generates a predicted numerical rating that indicates whether the intrusion detection rule is likely to be effective in identifying malicious communications when used in a second intrusion detection system. If the predicted numerical rating is sufficiently high, then the electronic circuitry transmits a message to the second intrusion detection system recommending the intrusion detection rule for use in the second intrusion detection system.

Advantageously, the improved techniques place fewer burdens on the experience and knowledge of an administrator of an intrusion detection system. Instead, the rules that define the operation of the intrusion detection system are based on the experiences of other administrators.

One embodiment of the improved techniques is directed to a method of providing a rule to detect malicious activity. The method includes receiving, by processing circuitry and from a first malicious activity detection system, an indication of whether a malicious activity detection rule is effective when used in the first malicious activity detection system to detect malicious activity. The method also includes, based on the indication, locating, by the processing circuitry, a second malicious activity detection system in which the malicious activity detection rule is predicted to be effective in detecting malicious activity. The method further includes, in response to locating the second malicious activity detection system, transmitting, by the processing circuitry, a message to the second malicious activity detection system indicating that the malicious activity detection rule is predicted to be effective when used in the second malicious activity detection system to detect malicious activity.

Additionally, some embodiments are directed to an apparatus constructed and arranged to provide a rule to detect malicious activity. The apparatus includes a network interface, memory and controlling circuitry coupled to the memory. The controlling circuitry is constructed and arranged to carry out a method of providing a rule to detect malicious activity.

Further, some embodiments are directed to a computer program product having a non-transitory, computer-readable storage medium which stores executable code, which when executed by a controlling circuitry, causes the controlling circuitry to perform a method of providing a rule to detect malicious activity.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry that are involved in providing a rule to detect malicious activity.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques provide a recommendation of an intrusion detection rule to an administrator of an intrusion detection system based on the experience of another administrator that has used the rule in another intrusion detection system. For example, suppose that electronic circuitry receives a numerical rating from a first intrusion detection system that indicates whether an intrusion detection rule was effective in identifying malicious activity when used in the first intrusion detection system. Based on the received rating and attributes of the first intrusion detection system, the electronic circuitry generates a predicted numerical rating that indicates whether the intrusion detection rule is likely to be effective in identifying malicious communications when used in a second intrusion detection system. If the predicted numerical rating is sufficiently high, then the electronic circuitry transmits a message to the second intrusion detection system recommending the intrusion detection rule for use in the second intrusion detection system.

Advantageously, the improved techniques place fewer burdens on the experience and knowledge of an administrator of an intrusion detection system. Instead, the rules that define the operation of the intrusion detection system are based on the collective experiences of multiple administrators.

Figure 1:
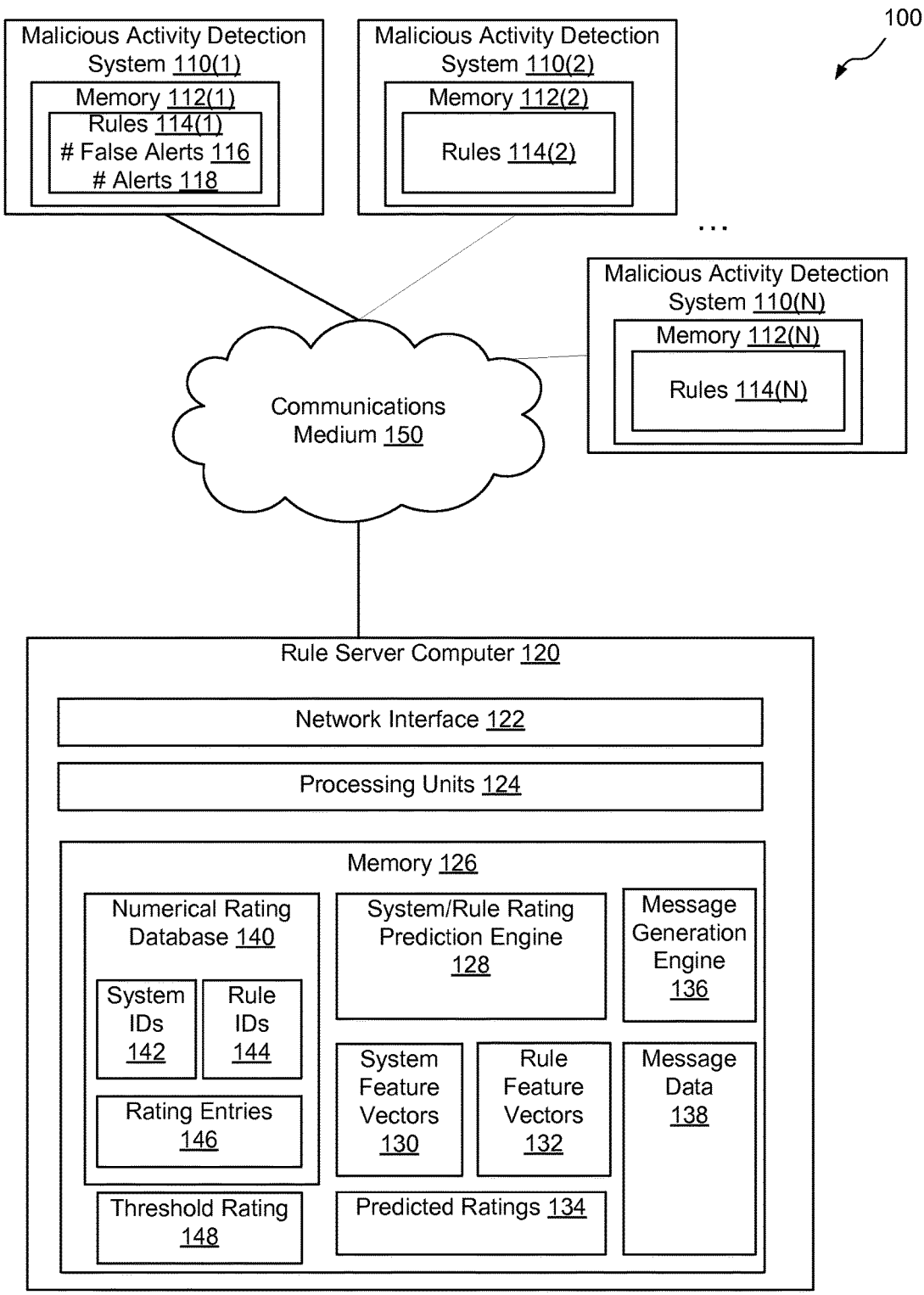
FIG. 1 is a block diagram illustrating an example electronic environment in which the improved technique can be carried out.

FIG. 1 shows an example electronic environment 100 in which embodiments of the improved techniques hereof can be practiced. The electronic environment 100 includes malicious activity detection systems 110(1), 110(2) . . . , 110(N) (malicious activity detection systems 110), rule server computer 120, and communications medium 150.

Each of the malicious activity detection systems 110 is constructed and arranged to malicious activity within incoming traffic from communications medium 150. As illustrated in FIG. 1, each malicious activity detection system 110(1), 110(2), . . . , 110(N) may be configured as a computer system having a respective memory 112(1), 112(2), . . . , 112(N). In each respective memory 112(1), 112(2), . . . , 112(N) the malicious activity detection system 110(1), 110(2), . . . , 110(N) stores a set of malicious activity detection rules 114(1), 114(2), . . . , 114(N) which provide instructions for identifying malicious activity and causing the malicious activity detection system 110(1), 110(2), . . . , 110(N) to perform an action in response.

In some arrangements, a respective memory, e.g., 112(1) also stores a number of false alerts 116 and a total number of alerts 118 issued according to particular rules 114(1). From these numbers 116 and 118, the rule server computer may compute intrinsic ratings for a rule 114(1). For example, the malicious activity detection system 110(1) may receive feedback in response to each alert issued according to a rule 114(1) indicating whether the alert issued was a true alert (i.e., resulted in drawing attention to a malicious communication) or a false alert (i.e., resulted in drawing attention to a non-malicious communication). A numerical rating then may be equal to a scale factor times the ratio of the number of true alerts to the total number of alerts 118.

The rule server computer 120 is constructed and arranged to collect numerical ratings for rules 114(1), 114(2), . . . , 114(N) used by malicious activity detection systems 110. For example, the rule server computer 120 may be part of a family of server computers operated by third party service.

As illustrated in FIG. 1, the rule server computer 120 includes a network interface 122, a processor 124, and memory 126. The network interface 122 includes, for example, adapters, such as SCSI target adapters and network interface adapters, for converting electronic and/or optical signals received from the communications medium 150 to electronic form for use by the rule server computer 120. The processor 124 includes one or more processing chips and/or assemblies. In a particular example, the processor 124 includes multi-core CPUs. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is also constructed and arranged to store various data, for example, numerical rating database 140, threshold rating 148, system feature vectors 130, rule feature vectors 132, predicted ratings 134, and message data 138. The memory 126 is further constructed and arranged to store a variety of software constructs realized in the form of executable instructions, such as a system/rule rating prediction engine 128 and message generation engine 136. When the executable instructions are run by the processor 124, the processor 124 is caused to carry out the operations of the software constructs. Although certain software constructs are specifically shown and described, it should be understood that the memory 126 typically includes many other software constructs, which are not shown, such as an operating system, various applications, processes, and daemons, for example.

The numerical rating database 140 is a collection of numerical ratings that indicate whether a rule was effective when used in a malicious activity detection system 110. Each malicious activity detection system 110 is identified using a system ID 142 and each malicious activity detection rule 114 is identified using a rule ID 144. The numerical rating database 140 includes a set of entries 146 with each entry 146 having values of a system ID field, a rule ID field, and a numerical rating field.

Figure 2:
FIG. 2 within the electronic environment illustrated in FIG. 1.

FIG. 2 illustrates example rating entries 146. Each malicious activity detection system 110 is identified by a value of the system ID field which in this case is a five-digit number. Each malicious activity detection rule 114 is identified by a value of the rule ID field which in this case is an eight-digit number. The numerical ratings are numbers between 0.0 and 5.0, where 0.0 indicates a rule that is completely ineffective when used in a particular system and 5.0 indicates a rule that is completely effective when used in a particular system.

It should be understood that the numerical ratings may either be intrinsic or extrinsic. Intrinsic numerical ratings are derived from data collected by malicious activity detection systems 110. For example, a numerical rating as illustrated in FIG. 2 may be obtained intrinsically by taking the ratio of the number of true alerts generated to the total number of alerts 118 generated according to a rule 114 and multiplying the ratio by 5.0. In contrast, extrinsic numerical ratings are supplied explicitly by an administrator, e.g., a rating of zero to five stars.

It should also be understood that not every known malicious activity detection rule 114 is used by each malicious activity detection system 110. Rather, if the numerical ratings were represented as a matrix with systems as rows and rules as columns, then the matrix would be sparse: most rules 114 have not been used in most systems 110.

Referring back to FIG. 1, the system feature vectors 130 and the rule feature vectors 132 represent, respectively, particular descriptors of systems 110 and rules 114, respectively. It should be understood that two different systems 110 may have the same system feature vector 130 and two different rules 114 may have the same rule feature vector 132. Each of the system feature vectors 130 and rule feature vectors 132 have the same number of components. Each of the components of the system feature vectors 130 and rule feature vectors 132 represents some attribute of the systems 110 or rules 114, respectively. For example, the first component of a system feature vector 130 may represent an affinity that a system 110(1) has for the financial sector, while the first component of a rule feature vector 132 may represent an amount of usage that a rule 114(1) has had within the financial sector. Because each respective component of the system feature vector 130 and the rules feature vector 132 represent analogous attributes, an inner product of a system feature vector 130 and a rules feature vector 132 may represent a predicted numerical rating of a rule 114 when used in a particular system 110.

In some arrangements, prior to operation of the rule server computer 110, the system feature vectors 130 and rule feature vectors 132 are unknown quantities and are assigned values by the rule server computer 120 during the generation of predicted numerical ratings 134. However, in other arrangements, the system feature vectors 130 and rule feature vectors 132 are known based on system and rule attributes, respectively.

The threshold rating 148 is a rating value above which a predicted numerical rating causes a message containing message data 138 to be sent to a malicious activity detection system 110.

The message data 138 contains (i) an identifier of a malicious activity detection system 110, (ii) an identifier of a malicious activity detection rule 114, and (iii) statistics involving actual usage of the identified rule in other malicious activity detection systems 110.

The system/rule rating prediction engine 128 causes processing units 124 to output predicted ratings 136 based on the system feature vectors 130 and rule feature vectors 132. In some arrangements, the system/rule rating prediction engine 128 further causes processing units 124 to output the system feature vectors 130 and rule feature vectors 132 based on the rating entries 146.

The message generation engine 136 causes processing units 124 to send messages containing message data 138 to malicious activity detection systems 110 according to whether the predicted ratings 136 are greater than the threshold rating 148.

The communications medium 150 provides network connections among the malicious activity detection systems 110 and the rule server computer 120. Communications medium 150 may implement any of a variety of protocols and topologies that are in common use for communications over the Internet. Furthermore, communications medium 150 may include various components (e.g., cables, switches/routers, gateways/bridges, etc.) that are used in such communications.

During operation, rule server computer 120 receives numerical ratings via network interface 122 that indicate whether malicious activity detection rules 114 were deemed effective when used in respective malicious activity detection systems 110. As explained above, the numerical ratings may be intrinsic or extrinsic. When the ratings are intrinsic, the rule server computer 120 may actually receive a number of true alerts issued and a total number of alerts issues and then compute a numerical rating based on the ratio of the two numbers of alerts. In contrast, when the ratings are extrinsic, the rule server computer 120 simply receives explicit ratings and does not perform any computation. Upon receipt of the numerical ratings, the processing units 124 store the numerical ratings in the numerical rating database 140.

At some point in time after storing the numerical ratings in the numerical rating database 140, the rule server computer 120 invokes the system/rule rating prediction engine 128 which causes processing units 124 to output predicted ratings 134 from the rating entries 146. In some arrangements, the system/rule rating prediction engine 128 includes a collaborative filtering algorithm and the output also includes system feature vectors 130 and rule feature vectors 132. In this case, the processing units 124 used the output system feature vectors 130 and rule feature vectors 132 to generate the predicted ratings 134. In other arrangements, however, the system/rule rating prediction engine 128 is based on simple statistics and the system feature vectors 130 and rule feature vectors 132 are known ahead of time.

Once the predicted ratings 134 have been generated, the rule server computer 120 compares each predicted rating 134 to the threshold rating 148. If a predicted rating 134 of a malicious activity detection rule 114 used in a malicious activity detection system, e.g., 110(1) is greater than the threshold rating 148, then the rule server computer 120 invokes the message generation engine 136.

The message generation engine 136 generates a message to be sent to the malicious activity detection system 110(1) based on message data 138. The message data 138 contains (i) an identifier of a malicious activity detection system 110, (ii) an identifier of a malicious activity detection rule 114, and (iii) statistics involving actual usage of the identified rule in other malicious activity detection systems 110. For example, the message data 138 in this case identifies malicious activity detection system 110(1) as the target system for the message, the rule 114 as the malicious activity detection rule to be recommended to the malicious activity detection system 110(1). The statistics are simply taken from the other malicious activity detection systems 110, e.g., number of alerts sent, number of malicious communications blocked, amount of money saved by preventing fraud from malicious communications, etc. Once generated, the message generation engine 136 sends the generated message to the identified malicious activity detection system 110(1).

It should be understood that the rule server computer 120 only sends a message to the systems 110 to recommend rules 114. It is up to administrators of these systems whether these rules actually get used in these systems.

Figure 3:
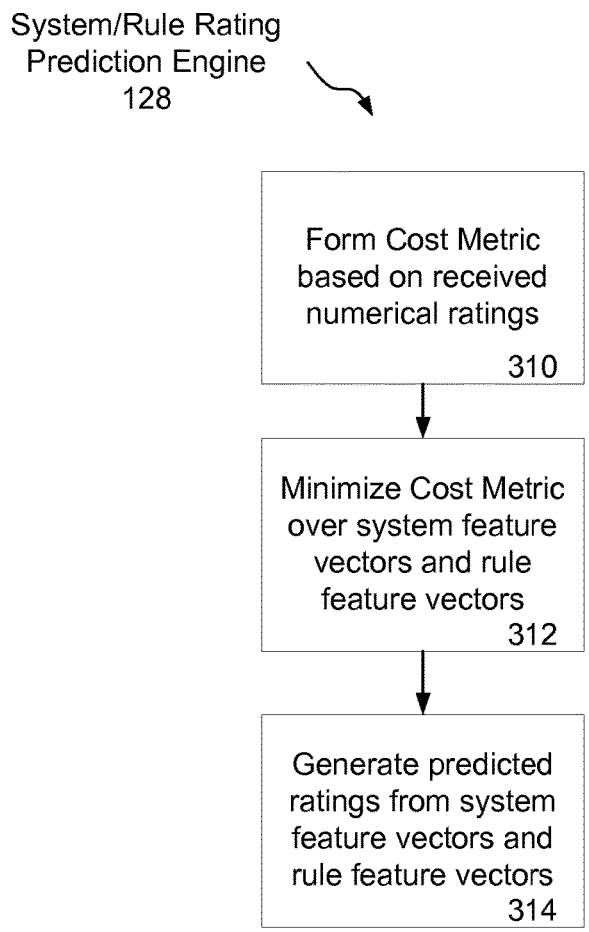
FIG. 3 is a flow chart illustrating within the electronic environment illustrated in FIG. 1.

FIG. 3 illustrates an example process used by the system/rule rating prediction engine 128 to output predicted ratings 134. In this example, it is assumed that the system/rule rating prediction engine 128 includes a collaborative filtering algorithm. Thus, the system feature vectors 130 and rule feature vectors 132 are not known yet and will be generated by the system/rule rating prediction engine 128.

At 310, the system/rule rating prediction engine 128 causes the processing units 124 to form a cost metric based on the received numerical ratings. It should be understood that this cost metric will be a function of the system feature vectors 130 and the rule feature vectors 132 for each system 110 and rule 114, respectively.

Define $\theta^{(j)}$ be the jth system feature vector and $X^{(i)}$ be the ith rule feature vector, where $i \in \{1, 2, 3, \ldots, P\}$ and $j \in \{1, 2, 3, \ldots, Q\}$ and each of $\theta^{(j)}$ and $X^{(i)}$ has n components. Further, define $y^{(i,j)}$ as the numerical rating received concerning the ith rule used in the jth system. Finally, define r(i,j) to be 1 when the ith rule was rated by the jth system and 0 otherwise. Then a cost function used by the system/rule rating prediction engine 128 takes the following form:

$$J(X^{(1)}, X^{(2)}, \ldots, X^{(P)}, \theta^{(1)}, \theta^{(2)}, \ldots, \theta^{(Q)}) \frac{1}{2} \sum_{(i,j):r(i,j)=1} (\theta^{(j)T} X^{(i)} - y^{(i,j)})^2 +$$

$$\frac{\lambda}{2} \sum_{i=1}^{P} \sum_{k=1}^{n} (X_k^{(i)})^2 + \frac{\lambda}{2} \sum_{j=1}^{Q} \sum_{k=1}^{n} (\theta_k^{(j)})^2,$$

where $\lambda$ is a Lagrange multiplier for the regularization terms and T denotes a matrix transpose (and thus the product of the two feature vectors is an inner product).

It should be understood that two separate systems may have the same system feature vector 130. In that case, the system/rule rating prediction engine 128 may operate only on unique system feature vectors and may this collapse both such systems into that same feature vector 130. Analogously, two distinct rules 114 may have the same rule feature vectors 132 and the system/rule rating prediction engine 128 may collapse both such rules into that same rule feature vector 132.

It should also be understood that the cost metric may be seen as a function of n(P+Q) unknown components.

At 312, the system/rule rating prediction engine 128 causes the processing units 124 to minimize the cost function over the n(P+Q) unknown components. Formally, such a minimization may be effected by simultaneously solving the n(P+Q) simultaneous equations $$\frac{\partial J}{\partial X_k^{(i)}} = 0$$

$$\frac{\partial J}{\partial \theta_k^{(j)}} = 0$$

Alternatively, a practical, numerical minimization scheme includes a gradient descent algorithm. As such minimization algorithms are well-known in the literature, no further discussion of them is necessary here.

The minimization of the cost metric results in the system feature vectors 130 and the rule feature vectors 132 for all such systems 110 and rules 114.

At 314, the system/rule rating prediction engine 128 causes the processing units 124 to generate predicted ratings 134 from the derived system feature vectors 130 and rule feature vectors 132. For example, the predicted rating of a system 110 having the ith rule feature vector $X^{(i)}$ and a rule having the jth system feature vector $\theta^{(j)}$ is equal to $\theta^{(j)T} X^{(i)}$.

In some arrangements, the values of the system feature vectors 130 and the rule feature vectors 132 may be stored in memory 126 for future use. For example, suppose that soon after these feature vectors are computed, the rule server computer receives a new rule deemed to be similar enough to another rule that has a rule feature vector 132 stored in memory 126. Then the rule server computer may use that rule feature vector 132 to predict ratings of the rule when used in the various systems 110 by computing the inner product of that rule feature vector 132 with each of the system feature vectors 130 stored in memory 126.

Figure 4:
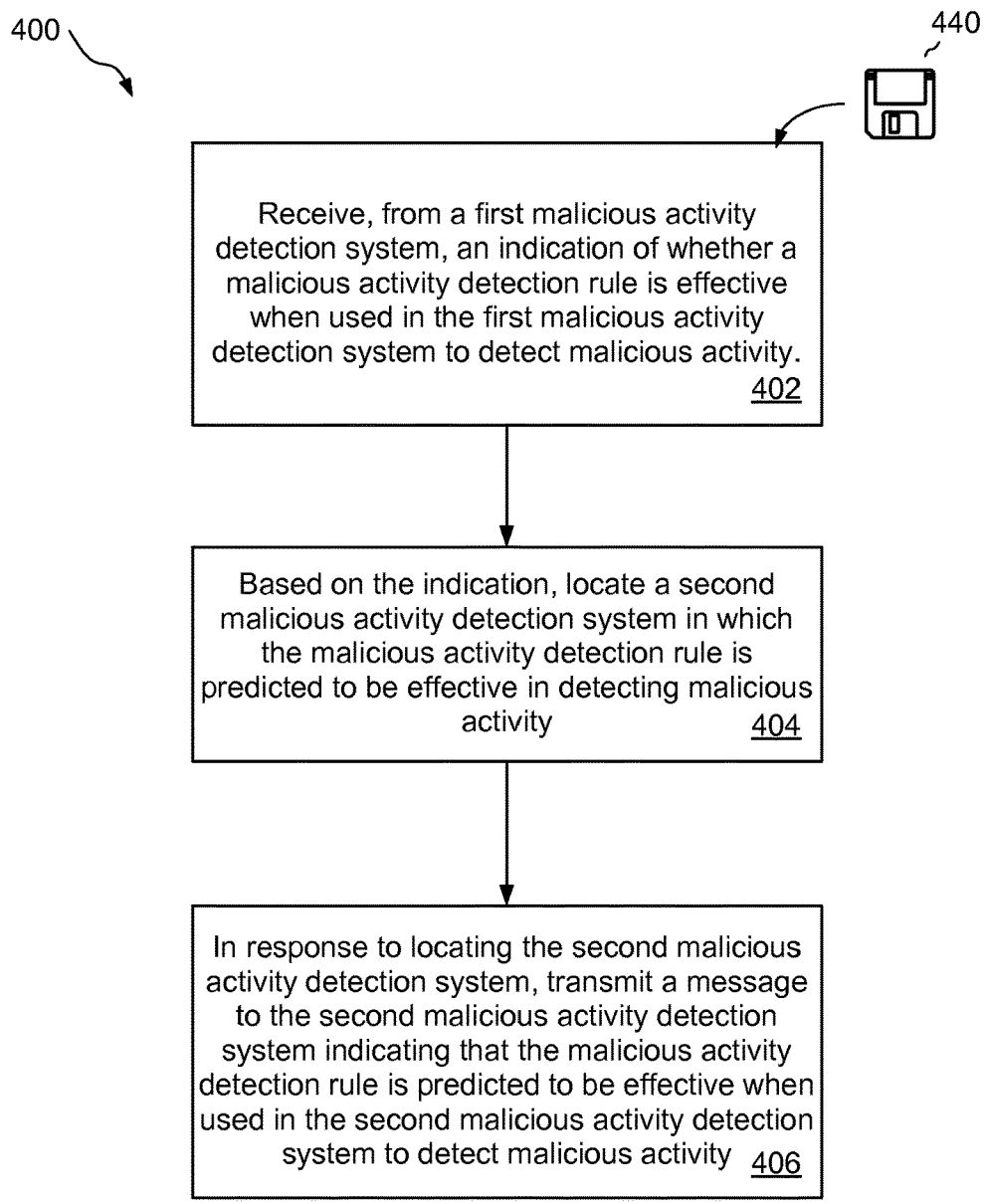
FIG. 4 is a flow chart illustrating a method of carrying out the improved technique within the electronic environment illustrated in FIG. 1.

FIG. 4 illustrates a method 400 of providing a rule to detect malicious activity. The method 400 may be performed by the software constructs described in connection with FIG. 1, which reside in the memory 126 of the rule server computer 120 and are run by the processor 124.

At 402, an indication of whether a malicious activity detection rule is effective when used in the first malicious activity detection system to detect malicious activity is received from a first malicious activity detection system. For example, the rule server computer 120 receives numerical ratings from a malicious activity detection system 110.

At 404, a second malicious activity detection system in which the malicious activity detection rule is predicted to be effective in detecting malicious activity is located based on the indication. For example, the rule server computer 120 invokes the system/rule rating prediction engine 128 to predict numerical ratings for rules 114 that may be used in malicious activity detection systems 110.

At 406, a message to the second malicious activity detection system indicating that the malicious activity detection rule is predicted to be effective when used in the second malicious activity detection system to detect malicious activity is transmitted in response to locating the second malicious activity detection system. For example, the rule server computer 120 invokes the message generation engine 136 when the predicted numerical ratings for those rule/system combinations exceed the threshold rating 148.

Improved techniques provide recommendations of intrusion detection rules for use in intrusion detection systems based on the experiences of other administrators that have used such rules in other intrusion detection systems. The other administrators operate malicious activity detection systems 110 that store malicious activity detection rules 114. The experiences of these administrators are encapsulated in the numerical ratings, extrinsic or intrinsic, sent to the rule server computer 120. Based on these experiences, i.e., numerical ratings, the rule server computer 120 generates predicted ratings 134 for the malicious activity detection rules 114 when used in other malicious activity detection systems, say 110(N). If the predicted rating 134 for a malicious activity detection rule 114(i) used in a malicious activity detection system 110(j) is greater than the rating threshold 148, the rule server computer 120 generates a message recommending the malicious activity detection rule 114(i) to the malicious activity detection system 110(j).

In this way, the operation of a malicious activity detection system is not dependent on the experience and knowledge of an administrator. Rather, the administrators of such systems may rely on the collected wisdom of his/her peers using the crowd-sourcing techniques described herein.

While various embodiments of the present disclosure have been particularly shown and described, it will be understood by those skilled in the art that various changes in form and details may be made therein without departing from the spirit and scope of the present disclosure as defined by the appended claims.

For example, although the example presented herein involves collaborative filtering in which system and rule feature vectors are generated from the numerical ratings, other techniques of predicting numerical ratings may be used. For example, other techniques such as a restricted Boltzmann machine, content-based algorithms, non-personalized algorithms, and others may be used to predefine the system and rule feature vectors so that predicted numerical ratings may be directly computed.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 440 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A computer-implemented method of providing a rule to detect malicious activity, the computer-implemented method comprising:
   receiving, by processing circuitry and from a first malicious activity detection system, an indication of whether a malicious activity detection rule is effective when used in the first malicious activity detection system to detect malicious activity, the received indication including a numerical rating value, a high numerical rating value indicating that the malicious activity detection rule is effective when used in the first malicious activity detection system to detect malicious activity;
   performing a numerical rating prediction operation to produce predicted numerical rating values indicating whether the malicious activity detection rule is predicted to be effective in other malicious activity detection systems that have not indicated using the malicious activity detection rule, the predicted numerical rating values including a predicted numerical rating value, the other malicious activity detection systems including a second malicious activity detection system;
   based on the indication, locating, by the processing circuitry, the second malicious activity detection system in which the malicious activity detection rule is predicted to be effective in detecting malicious activity, the locating of the second malicious activity detection system including comparing each of the predicted numerical rating values to a threshold rating value, the predicted numerical rating value indicating whether the malicious activity detection rule is predicted to be effective in the second malicious activity detection system exceeding the threshold rating value;
   initiating transmitting, by the predicted numerical rating value exceeding the threshold rating value, a message to the second malicious activity detection system recommending the malicious activity detection rule for use in the second malicious activity detection system to detect malicious activity,
   wherein each of the first malicious activity detection system and the other malicious activity detection systems is described by a respective one of a finite number of system descriptors,
   wherein the malicious activity detection rule is described by one of a finite number of rule descriptors, and
   wherein the performing of the numerical rating prediction operation includes:
      deriving, from the numerical rating value received from the first malicious activity detection system, (i) the respective system descriptor of each of the first malicious activity detection system and the other malicious activity detection systems and (ii) the rule descriptor of the malicious activity detection rule; and
      generating the predicted numerical rating values based on the derived system descriptors and the derived rule descriptor, the generated predicted numerical rating values including a generated predicted numerical rating value; and
   initiating detecting, by the generated predicted numerical rating value exceeding the threshold rating value, malicious activity by the second malicious activity detection system using the malicious activity detection rule.

2. A computer-implemented method as in claim 1, wherein receiving the indication of whether the malicious activity detection rule is effective from the first malicious activity detection system includes obtaining, from the first malicious activity detection system, a ratio of a number of false alerts to a number of total alerts generated by the first malicious activity detection system using the malicious activity detection rule.

3. A computer-implemented method as in claim 2, further comprising:
   having initiated the transmitting of the message to the second malicious activity detection system, transmitting the message to the second malicious activity detection system including providing a number of actual alerts to the second malicious activity detection system, the number of actual alerts being a difference between the number of total alerts and the number of false alerts generated by the first malicious activity detection system using the malicious activity detection rule.

4. A computer-implemented method as in claim 1, wherein each of the finite number of system descriptors is a system feature vector having a specified number of components,
   wherein each of finite number of rule descriptors is a rule feature vector having the specified number of components, and
   wherein deriving includes:
      forming a cost metric, the cost metric being a function of (i) each of the respective system feature vectors of each of the first malicious activity detection system and the other malicious activity detection systems, (ii) the rule feature vector of the malicious activity detection rule, and (iii) the received numerical rating value; and
      finding values of the components of each of the respective system feature vectors and the rule feature vector that minimizes the cost metric.

5. A computer-implemented method as in claim 4, wherein generating the predicted numerical rating values includes computing, as the predicted numerical rating value indicating whether the malicious activity detection rule is predicted to be effective in each of the other malicious activity detection systems, an inner product of the respective system feature vector of that other malicious activity detection system and the rule feature vector.

6. A computer-implemented method as in claim 1, further comprising:
receiving another malicious activity detection rule;
deriving another rule descriptor of the other malicious activity detection rule; and
generating other predicted numerical rating values indicating whether the other malicious activity detection rule is predicted to be effective in the other malicious activity detection systems based on the derived system descriptors and the derived other rule descriptor.

7. A computer-implemented method as in claim 1, further comprising:
having initiated the transmitting of the message to the second malicious activity detection system, transmitting the message to the second malicious activity detection system including computing an amount of money saved when the malicious activity detection rule is used in the first malicious activity detection system to detect malicious activity; and
providing a notification of the amount of money saved within the message.

8. A computer-implemented method as in claim 1, wherein the initiating transmitting of the message includes initiating transmitting the message containing one or more of (i) a first identifier of the second malicious activity detection system, (ii) a second identifier of the malicious activity detection rule, and (iii) statistics involving actual usage of the malicious activity detection rule in the other malicious activity detection systems.

9. A computer program product having a non-transitory computer readable medium which stores a set of instructions to provide a rule to detect malicious activity, the set of instructions, when carried out by computerized circuitry, causing the computerized circuitry to perform a method of:
receiving, by processing circuitry and from a first malicious activity detection system, an indication of whether a malicious activity detection rule is effective when used in the first malicious activity detection system to detect malicious activity, the received indication including a numerical rating value, a high numerical rating value indicating that the malicious activity detection rule is effective when used in the first malicious activity detection system to detect malicious activity;
performing a numerical rating prediction operation to produce predicted numerical rating values indicating whether the malicious activity detection rule is predicted to be effective in other malicious activity detection systems that have not indicated using the malicious activity detection rule, the predicted numerical rating values including a predicted numerical rating value, the other malicious activity detection systems including a second malicious activity detection system;
based on the indication, locating, by the processing circuitry, the second malicious activity detection system in which the malicious activity detection rule is predicted to be effective in detecting malicious activity, the locating of the second malicious activity detection system including comparing each of the predicted numerical rating values to a threshold rating value, the predicted numerical rating value indicating whether the malicious activity detection rule is predicted to be effective in the second malicious activity detection system exceeding the threshold rating value;
initiating transmitting, by the predicted numerical rating value exceeding the threshold rating value, a message to the second malicious activity detection system recommending the malicious activity detection rule for use in the second malicious activity detection system to detect malicious activity,
wherein each of the first malicious activity detection system and the other malicious activity detection systems is described by a respective one of a finite number of system descriptors,
wherein the malicious activity detection rule is described by one of a finite number of rule descriptors, and
wherein the performing of the numerical rating prediction operation includes:
deriving, from the numerical rating value received from the first malicious activity detection system, (i) the respective system descriptor of each of the first malicious activity detection system and the other malicious activity detection systems and (ii) the rule descriptor of the malicious activity detection rule; and
generating the predicted numerical rating values based on the derived system descriptors and the derived rule descriptor, the generated predicted numerical rating values including a generated predicted numerical rating value; and
initiating detecting, by the generated predicted numerical rating value exceeding the threshold rating value, malicious activity by the second malicious activity detection system using the malicious activity detection rule.

10. A computer program product as in claim 9, wherein receiving the indication of whether the malicious activity detection rule is effective from the first malicious activity detection system includes obtaining, from the first malicious activity detection system, a ratio of a number of false alerts to a number of total alerts generated by the first malicious activity detection system using the malicious activity detection rule.

11. A computer program product as in claim 10, further comprising:
having initiated the transmitting of the message to the second malicious activity detection system, transmitting the message to the second malicious activity detection system including providing a number of actual alerts to the second malicious activity detection system, the number of actual alerts being a difference between the number of total alerts and the number of false alerts generated by the first malicious activity detection system using the malicious activity detection rule.

12. A computer program product as in claim 9, wherein each of the finite number of system descriptors is a system feature vector having a specified number of components,
wherein each of finite number of rule descriptors is a rule feature vector having the specified number of components, and
wherein deriving includes:
forming a cost metric, the cost metric being a function of (i) each of the respective system feature vectors of each of the first malicious activity detection system and the other malicious activity detection systems, (ii) the rule feature vector of the malicious activity detection rule, and (iii) the received numerical rating value; and finding values of the components of each of the respective system feature vectors and the rule feature vector that minimizes the cost metric.

13. A computer program product as in claim 12, wherein generating the predicted numerical rating values includes computing, as the predicted numerical rating value indicating whether the malicious activity detection rule is predicted to be effective in each of the other malicious activity detection systems, an inner product of the respective system feature vector of that other malicious activity detection system and the rule feature vector.

14. A computer program product as in claim 9, further comprising:

receiving another malicious activity detection rule;

deriving another rule descriptor of the other malicious activity detection rule; and generating other predicted numerical rating values indicating whether the other malicious activity detection rule is predicted to be effective in the other malicious activity detection systems based on the derived system descriptors and the derived other rule descriptor.

15. An electronic apparatus, comprising:

a user interface;

memory; and control circuitry coupled to the user interface and the memory, the memory storing instructions which, when carried out by the control circuitry, cause the control circuitry to:

receive, from a first malicious activity detection system, an indication of whether a malicious activity detection rule is effective when used in the first malicious activity detection system to detect malicious activity, the received indication including a numerical rating value, a high numerical rating value indicating that the malicious activity detection rule is effective when used in the first malicious activity detection system to detect malicious activity;

perform a numerical rating prediction operation to produce predicted numerical rating values indicating whether the malicious activity detection rule is predicted to be effective in other malicious activity detection systems that have not indicated using the malicious activity detection rule, the predicted numerical rating values including a predicted numerical rating value, the other malicious activity detection systems including a second malicious activity detection system;

based on the indication, locate the second malicious activity detection system in which the malicious activity detection rule is predicted to be effective in detecting malicious activity, locating of the second malicious activity detection system including comparing each of the predicted numerical rating values to a threshold rating value, the predicted numerical rating value indicating whether the malicious activity detection rule is predicted to be effective in the second malicious activity detection system exceeding the threshold rating value;

initiate transmission, by the predicted numerical rating value exceeding the threshold rating value, of a message to the second malicious activity detection system recommending the malicious activity detection rule for use in the second malicious activity detection system to detect malicious activity, wherein each of the first malicious activity detection system and the other malicious activity detection systems is described by a respective one of a finite number of system descriptors, wherein the malicious activity detection rule is described by one of a finite number of rule descriptors, and wherein the memory stores the instructions which, when carried out by the control circuitry, further cause the control circuitry to perform the numerical rating prediction operation, including to:

derive, from the numerical rating value received from the first malicious activity detection system, (i) the respective system descriptor of each of the first malicious activity detection system and the other malicious activity detection systems and (ii) the rule descriptor of the malicious activity detection rule; and generate the predicted numerical rating values based on the derived system descriptors and the derived rule descriptor, the generated predicted numerical rating values including a generated predicted numerical rating value; and wherein the memory stores the instructions which, when carried out by the control circuitry, further cause the control circuitry to initiate detecting, by the generated predicted numerical rating value exceeding the threshold rating value, malicious activity by the second malicious activity detection system using the malicious activity detection rule.

* * * * *